United States Patent
Lobo et al.

(10) Patent No.: US 9,498,905 B2
(45) Date of Patent: Nov. 22, 2016

(54) SINGLE-SHOT MOLDED VEHICLE STRUCTURAL BODY COMPONENT AND METHOD OF MAKING THE SAME

(75) Inventors: Harry Lobo, Canton, MI (US); Joel Thomas Pierce, Whitmore Lake, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1231 days.

(21) Appl. No.: 13/469,638

(22) Filed: May 11, 2012

(65) Prior Publication Data
US 2013/0302585 A1  Nov. 14, 2013

(51) Int. Cl.
*B29C 44/02* (2006.01)
*B29C 44/10* (2006.01)
*B62D 25/02* (2006.01)

(52) U.S. Cl.
CPC .......... *B29C 44/105* (2013.01); *B62D 25/025* (2013.01)

(58) Field of Classification Search
CPC ............ B29C 44/105; B29C 45/7312; B29C 2045/7343; B62D 25/025
See application file for complete search history.

(56) References Cited

U.S. PATENT DOCUMENTS

| | | | |
|---|---|---|---|
| 5,423,670 A * | 6/1995 | Hamel | B29C 45/2737 264/40.6 |
| 5,900,198 A * | 5/1999 | Hori | B29C 44/105 264/50 |
| 6,294,126 B1 * | 9/2001 | Eckardt | B29C 45/174 264/328.16 |
| 6,412,799 B1 | 7/2002 | Schrempf | |
| 6,513,821 B1 | 2/2003 | Heil | |
| 7,513,518 B1 | 4/2009 | Mayville et al. | |
| 2002/0074776 A1 * | 6/2002 | Labrie | B60R 21/216 280/728.3 |
| 2003/0015815 A1 * | 1/2003 | McClelland | B29C 44/105 264/51 |
| 2004/0239068 A1 | 12/2004 | Chuba et al. | |
| 2006/0036012 A1 | 2/2006 | Hayes et al. | |
| 2008/0119616 A1 * | 5/2008 | Donovan | C08L 79/08 525/432 |
| 2010/0010141 A1 * | 1/2010 | Nakamura | C08L 69/00 524/451 |

FOREIGN PATENT DOCUMENTS

CN   201042837 Y   4/2008

OTHER PUBLICATIONS

First Office Action, Chinese Patent Application No. 201310173519.5, May 4, 2016.

\* cited by examiner

*Primary Examiner* — Galen Hauth
(74) *Attorney, Agent, or Firm* — Jason C. Rogers; Brooks Kushman P.C.

(57) ABSTRACT

A structural body component, such as a rocker panel or rear spoiler, and a method of manufacture. The method may include heating a mixture having a polymer and a blowing agent, pressurizing a cavity of a mold, injecting the mixture into the cavity in a single shot such while exerting back-pressure against the mixture as it is injected, and cooling the mixture in the mold to form the component.

19 Claims, 2 Drawing Sheets

SINGLE-SHOT MOLDED VEHICLE STRUCTURAL BODY COMPONENT AND METHOD OF MAKING THE SAME

TECHNICAL FIELD

This disclosure relates to a structural body member and a method of manufacture.

BACKGROUND

Vehicle structural body members, such as exterior rocker panels and spoilers, may improve the appearance and/or aerodynamics of a vehicle. Improving vehicle aerodynamics is one way to improve vehicle fuel economy. High forces may be exerted on structural body members due to aerodynamic forces or other load forces.

Increasing the depth of an exterior rocker panel may improve the vehicle's relative aerodynamics by a reduction of up to 12 drag counts. As the depth of the rocker molding is increased, it protrudes further from the vehicle and people may increasingly use it as a step to enter and exit the vehicle or to access the area above their vehicle to load cargo onto luggage racks or clean vehicle surfaces. As such, rocker panels may be designed to support the weight of a person standing on the rocker panel. Increased rocker panel depth may also increase torque on the rocker panel as weight may be exerted on the rocker panel remotely from where the rocker panel is attached to the vehicle.

Spoilers are subjected to high aerodynamic forces, especially when the vehicle is moving at high speeds. In addition, spoilers may be used as a handle for opening and closing trunk lids and hatchback doors, or as a grab handle. As such, spoilers may be designed to support aerodynamic and non-aerodynamic load forces.

Currently rocker panels on most trucks and sport utility vehicles have a multi-piece construction that includes a metal structural member attached to the side or frame of the vehicle and a cap member attached to the structural member for appearance and/or aerodynamics. The metal structural member is typically extruded aluminum and the cap piece is typically a thin molded plastic. Attempts to mold such components as one piece structures having structural ribs or lattice work have been unsuccessful due to undesirable sink marks, flow lines and other imperfections on the visible surface of the structural body member or weak parts that are not capable of handling associated load forces.

SUMMARY

In at least one embodiment, a method of molding a vehicle component having a class A surface is provided. The vehicle component may be an exterior structural body component, such as a rocker panel or a spoiler. The method may include heating a mixture having a polymer and a blowing agent, pressurizing a cavity of a mold with a fluid, injecting the mixture into the cavity in a single shot such that the fluid exerts backpressure against the mixture as it is injected, and cooling the mixture in the mold to form the component.

DETAILED DESCRIPTION

As required, detailed embodiments of the present invention are disclosed herein; however, it is to be understood that the disclosed embodiments are merely examples and that the invention may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
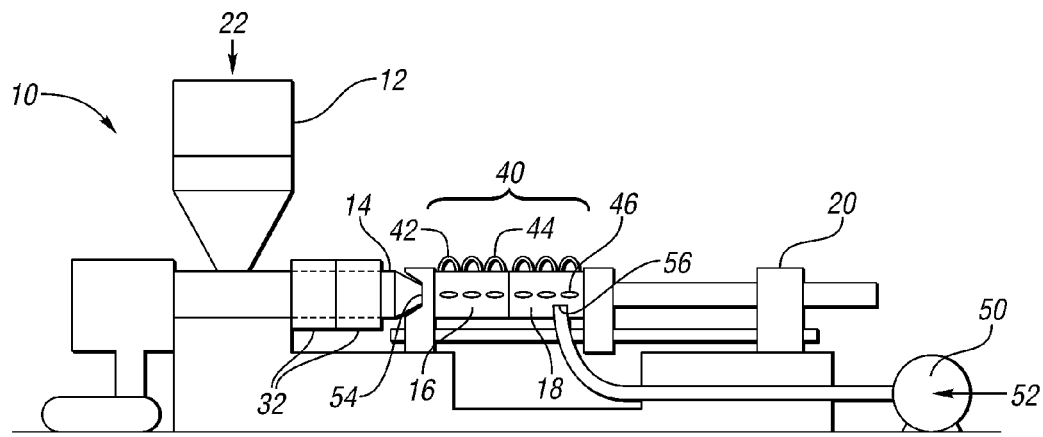
FIG. 1 is a side view of an injection molding machine.

Referring to FIG. 1, an exemplary injection molding machine 10 is shown. The injection molding machine 10 may include a hopper 12, an injection unit 14, a first mold 16, a second mold 18, and a clamping unit 20.

The hopper 12 may be configured to receive or store a mixture 22 of materials and provide the mixture 22 to the injection unit 14. The mixture 22 may include a polymer and a blowing agent. A blowing agent may be a substance which is capable of producing a cellular structure via a foaming process in a variety of materials that undergo hardening or phase transition. For example, a blowing agent may be a nitrogen encapsulated pellet mixed in with thermoplastic pellets to form a mixture and may be released from encapsulation when the pellet mixture is liquefied and expand during the phase transition of the mixture from liquid to solid as a material cools and forms. In at least one embodiment, the polymer may be a thermoplastic polyolefin and the blowing agent may include nitrogen. For example, the mixture 22 may include about 99.0% to 99.9% thermoplastic polyolefin pellets and 0.1% to 1% nitrogen encapsulated pellets.

Figure 2A:
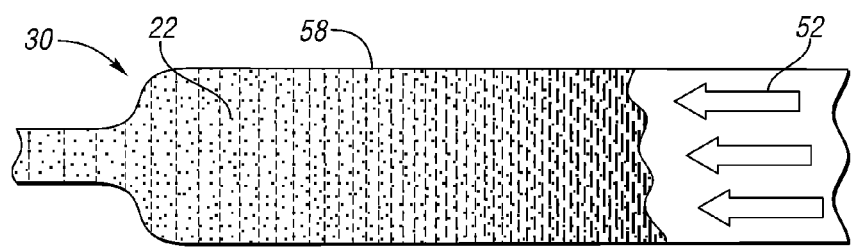
FIGS. 2a-2c illustrate first, second, and third stages of manufacturing a structural body member.
Figure 2B:
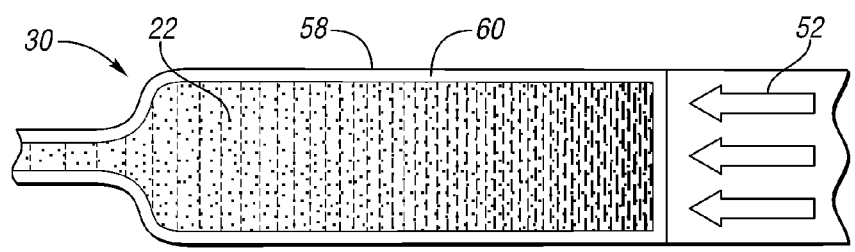
Figure 2C:
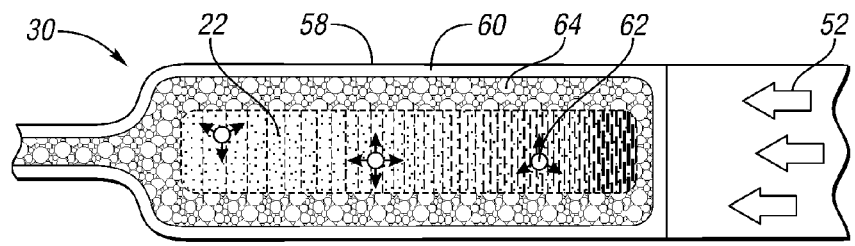

The injection unit 14 may melt the mixture 22 and provide the polymeric material under pressure to a mold cavity 30. The mold cavity 30 may be at least partially defined by the first mold 16 and the second mold 18. In FIGS. 2a-2c, the mold cavity 30 is shown without the first and second molds 16, 18 for clarity. In at least one embodiment, the injection unit 14 may be configured to heat the mixture 22 to a predetermined temperature so that melted material may be injected into the mold cavity 30. For instance, one or more heaters 32 may be provided to heat the mixture 22 or a chamber in the injection unit 14 that receives the mixture 22. It is also envisioned that the mixture 22 may be heated in the hopper 12 or before entering the hopper 12. In at least one embodiment, the mixture 22 may be heated to a temperature of at least 400° C. The mixture 22 may be injected in a single injection stroke or shot.

The clamping unit 20 may actuate the first and/or second molds 16, 18 between a closed position and an open position. In the closed position, the first mold 16 may be disposed adjacent to and may engage the second mold 18 to create the mold cavity 30. In the open position, the first mold 16 may be spaced apart from the second mold 18 to facilitate removal of a molded component or structural member from the mold cavity 30.

The injection molding machine 10 may also include cooling passages 40. The cooling passages 40 may be disposed proximate and/or provided in the first and/or second molds 16, 18 and may be spaced apart from the mold cavity 30. The cooling passages 40 may contain a heat transfer fluid 42 that may be circulated through the cooling passages 40 to aid in the cooling of the first mold 16, second mold 18, mold cavity 30, and/or mixture 22 of material in the mold cavity 30. The cooling passages 40 may be connected to a cooling system, in which the heat transfer fluid 42 may be a refrigerant that may be circulated through the first and/or second molds 16, 18.

The cooling passages 40 may have a number of compartmentalized sections 44, 46. The heat transfer fluid 42 in the compartmentalized sections 44, 46 may be independently controlled to help more precisely control heat removal from different areas of the first and second molds 16, 18. Characteristics of the heat transfer fluid, such as temperature and flow rate, may differ between compartmentalized sections 44, 46 to help provide a desired temperature or heat dissipation from the mixture 22 in the mold cavity 30. For example, to provide a uniform cooling rate of the mixture 22, areas of the mold cavity 30 containing the mixture 22 having a greater volume may require a greater rate of heat exchange than areas of the mold cavity 30 having a smaller volume. The heat transfer fluid 42 within a compartmentalized section corresponding to the area of the mold cavity 30 having a greater volume may have a lower temperature and/or be circulated at a higher flow rate.

The injection molding machine 10 may also include a pressurized fluid source 50. The pressurized fluid source 50 may contain and/or supply a pressurized fluid 52, such as a fluid mixture like nitrogen gas or shop air that is pressurized above atmospheric pressure. In at least one embodiment, the pressurized fluid source 50 may pressurize the mold cavity 30 to approximately 620 to 828 kilopascals (90 to 120 pounds per square inch). The pressurized fluid 52 may exert backpressure against the mixture 22 that is injected into the mold cavity 30 to affect molding of the mixture 22.

The pressurized fluid source 50 may be in fluid communication with the mold cavity 30. In at least one embodiment, the pressurized fluid source 50 may provide a pressurized fluid 52 to the mold cavity 30 via a different inlet than is used to inject the mixture 22 into the mold cavity 30. For instance, the mixture 22 may be provided through a first inlet 54 to the mold cavity 30, while the pressurized fluid 52 may be provided through a second inlet 56 to the mold cavity 30. In at least one embodiment, the first inlet 54 may be provided in the first mold 16 and the second inlet 56 may be provided in the second mold 18. Additional inlets for providing the mixture 22 and/or pressurized fluid 52 may also be provided. For example, additional inlets for providing pressurized fluid 52 to the mold cavity 30 may be employed at locations where the flow of the mixture 22 terminates, such as at rib portions or end points of the molded component. The pressurized fluid source 50 may also provide the pressurized fluid 52 along the parting line of the first and second molds 16, 18.

In at least one embodiment, a common inlet may provide the mixture 22 and pressurized fluid 52 to the mold cavity 30. For example, a valve may be provided to permit the mixture 22 or pressurized fluid 52 to enter the mold cavity 30. In such an embodiment, various outlets or chambers may be provided to vent or control the pressure exerted by the pressurized fluid 52 during injection of the mixture 22 into the mold cavity 30.

The pressurized fluid source 50 may pressurize the mold cavity 30 before the mixture 22 is injected or simultaneously while the mixture 22 is being injected to provide a backpressure to the incoming mixture 22. The pressurized fluid source 50 may substantially maintain the backpressure applied to the mixture 22 during the entire fill process of the mold cavity 30 to be from 620 to 828 kilopascals (90 to 120 pounds per square inch). As the mixture 22 fills the mold cavity 30 it may displace the pressurized fluid 52, yet the backpressure on the mixture 22 may be maintained, such as by return a volume of pressurized fluid 52 to the pressurized fluid source 50 or venting the pressurized fluid from the mold cavity 30. One or more pressure sensors may be employed to detect and provide data that may be used to monitor and control pressure of the pressurized fluid 52.

One or more pressure relief valves may be provided to facilitate venting of pressurized fluid 52. A pressure relief valve may be in fluid communication with the mold cavity 30 and may have any suitable configuration, such as a mechanical valve that may open at a specific pressure or pressure range or an electronically controlled pressure relief valve.

The pressurized fluid source 50 or a pressure relief valve may also reduce the pressure applied to the mixture 22 during the cooling of the mixture as will be discussed in more detail below. Additional pressure release may occur to bleed off any residual pressure within the mold cavity 30 before the first and second molds 16, 18 are opened, or when the molded component is suitably cooled such that it may retain geometric dimensions and/or a class A surface. A class A surface may be an exterior surface of the component that is visible to a person from the inside or outside of the vehicle during normal use, such as when driving the vehicle. As such, class A surfaces may have aesthetic quality characteristics, such as having no visible defects like dimples, blemishes, sinks, or marks when viewed to the naked eye (e.g., without magnification).

Referring to FIGS. 2a-2c, an exemplary sequence of illustrations showing injection molding of a structural component are shown. In these figures, the mold cavity 30 is shown without the first and second molds 16, 18 for clarity.

In FIG. 2a, the mixture 22 is shown partially injected into the mold cavity 30 with the direction of flow extending from left to right. Pressurized fluid 52, represented by the arrows, may be provided into the mold cavity 30 from a different inlet and may exert backpressure against the mixture 22. The pressurized fluid 52 may be injected into the mold cavity 30 before or simultaneously with the mixture 22. The backpressure exerted by the pressurized fluid 52 may force the mixture 22 against a cavity wall 58 of the mold cavity 30 as the mixture 22 fills the mold cavity 30. Pressurized fluid 52 is shown flowing in a direction that counters the flow of the mixture 22, or in a direction extending from right to left. The pressure and flow of the pressurized fluid 52 may be controlled to maintain a desired backpressure level or range. For instance, the mixture 22 may displace a portion of the pressurized fluid 52 from the mold cavity 30 through the second inlet 56 and/or through a pressure relief valve or other suitable device.

In FIG. 2b, the backpressure exerted by the pressurized fluid 52 is shown as being maintained at a substantially constant pressure while an outer surface 60 of the mixture 22 solidifies. The backpressure exerted by the pressurized fluid 52 against the mixture 22 may inhibit the blowing agents within the mixture 22 from releasing and expanding while the mixture 22 is injected into the mold cavity 30. Foaming and expanding of the blowing agent may be inhibited by maintaining pressure on the mixture 22 with the pressurized fluid 52. In addition, cooling of the mixture 22 may be initially cooled by circulating heat transfer fluid 42 through the cooling passages 40 as previously discussed. Uniform cooling may promote uniform blowing agent foaming and expansion and may also aid in providing a class A appearance on the surface of the molded component.

In FIG. 2c, the backpressure strength of the pressurized fluid 52 is shown as being reduced (represented by arrows of reduced size). The reduction of backpressure may permit the blowing agent 62 in the mixture 22 to fully expand (represented by expanding arrows). The mixture may continue to be cooled. As the mixture 22 continues to cool and solidify, the blowing agent 62 may expand to at least partially offset shrinking that may occur during the cooling process. The mixture 22 may then form an inner region 64 under the outer surface 60 that may have a reduced density as compared to the outer surface 60 and may have a foam-like consistency. The pressurized fluid 52 and the cooling passages 40 may work in combination to provide a quick skin for the outer surface 60 having a class A appearance. Moreover, the expansion of the blowing agent 62 and the controlled cooling of the mixture 22 may inhibit the formation of defects such as voids, sinks, or indentations in the outer surface 60 and permit an outer surface 60 having class A characteristics to be maintained.

Figure 3:
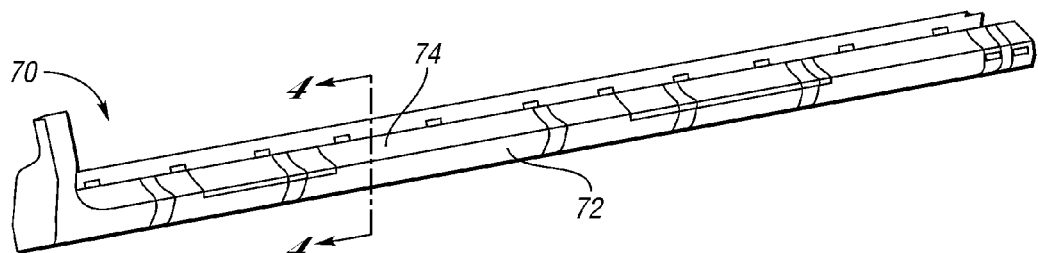
FIG. 3 is a perspective view of a structural body member configured as a rocker panel.
Figure 4:
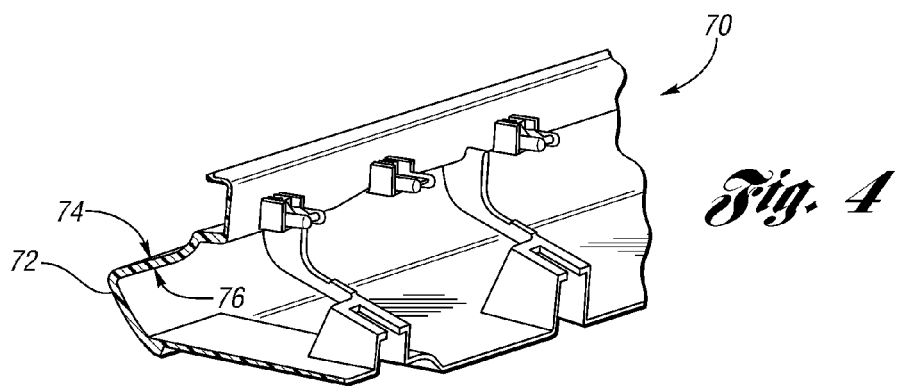
FIG. 4 is a section view along line 4-4 in FIG. 3.

Referring to FIGS. 3 and 4, an example of a rocker panel 70 produced using the method described above is shown. The rocker panel 70 may have substantially homogeneous thermoplastic olefin body 72 that has a first surface 74. The body 72 may be at least 1.6 meters (63 inches) in length. The body 72 may be a unitary one-piece component and the first surface 74 may be a class A surface. Referring also to FIG. 4, a second surface 76 is shown disposed opposite and substantially parallel to the first surface 74. The cross sectional thickness between the first and second surfaces 74, 76 may be at least 6 millimeters (0.24 inches) while maintaining a class A surface. The method disclosed may also produce a rocker panel 70 wherein the rocker panel 70 deflects less than 6 millimeters (0.24 inches) under a step load of about 90.7 kilograms (200 pounds).

Figure 5:
FIGS. 5 and 6 are perspective views of a structural body member configured as a spoiler.
Figure 6:
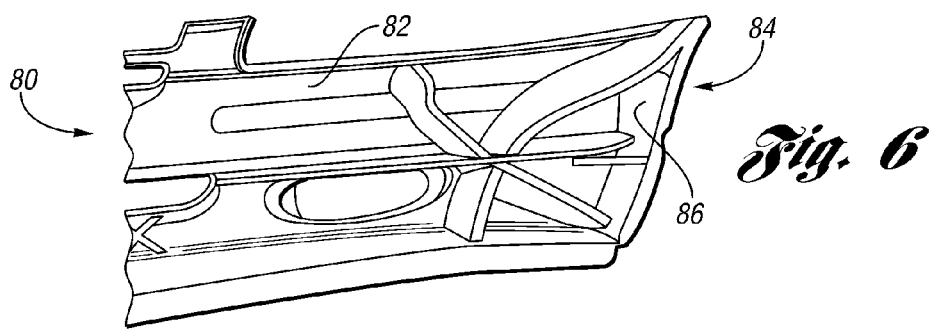

Referring to FIGS. 5 and 6, an example of a rear spoiler 80 produced using the methods disclosed is shown. The rear spoiler 80 may have substantially homogeneous thermoplastic olefin body 82 defining a first surface 84. The body 82 may be at least 1.6 meters (63 inches) in length while maintaining the first surface 84 as a class A surface. The body 82 may be a unitary one-piece component. Referring also to FIG. 6, a partial bottom view of the rear spoiler 80 is shown. A second surface 86 is shown disposed opposite and substantially parallel to the first surface 84, wherein a cross sectional thickness between the first and second surfaces 84, 86 may be at least 6 millimeters (0.24 inches) while maintaining a class A surface.

The method described above may be used to provide structural components without additional metal or structural plastic supports. Moreover, the method described above may allow structural components to be provided without glass filled or carbon filled structural plastics, which generally cannot be molded to provide class A surfaces. In addition, the use of such materials or the addition of additional supports adds substantial cost and may increase component weight, which may negate a portion of the fuel economy benefit of the aerodynamic improvement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A molding method comprising:
   pressurizing a cavity of a mold with a fluid;
   injecting a mixture having a polymer and a blowing agent into the cavity in a single shot while the fluid exerts backpressure against the mixture; and
   cooling the mixture in the mold to form a component, wherein the cavity is pressurized such that the backpressure of fluid is in contact with the mixture and prevents a portion of the mixture from engaging the mold from a time of injection, through a reduction in the backpressure, and until cooled into the component to form an outer surface of the component that does not engage the mold.

2. The method of claim 1 wherein at least a portion of the cavity is pressurized with the fluid to a predetermined pressure until a portion of the mixture solidifies to form an outer surface that engages the mold.

3. The method of claim 1 wherein the mixture is injected into the cavity through an inlet in a first direction and the fluid pressurizes the cavity in a second direction that opposes the first direction to exert the backpressure against the mixture.

4. The method of claim 1 wherein the mixture is provided to the mold via a first inlet and the fluid is provided to the mold via a second inlet that differs from the first inlet.

5. The method of claim 1 wherein the fluid is provided to the mold via a first inlet before the mixture is provided to the mold via the first inlet.

6. The method of claim 1 wherein the fluid is pressurized to approximately 90 to 120 pounds per square inch while the mixture is injected into the cavity.

7. The method of claim 1 wherein the fluid maintains the backpressure against the mixture while at least a portion of the mixture is cooled.

8. The method of claim 1 further comprising reducing the pressure in the cavity to a pressure above an ambient pressure, thereby promoting the releasing and expanding of the blowing agent while cooling the mixture in the mold to form at least a portion of the component.

9. The method of claim 1 wherein a class A surface is formed on the component.

10. The method of claim 1 wherein the mixture has a polymer and a blowing agent that consists of 99.0% to 99.9% thermoplastic polyolefin pellets and 0.1% to 1% nitrogen encapsulated pellets.

11. The method of claim 1 wherein the mixture is injected into the mold at a temperature of at least 400° Celsius.

12. The method of claim 1 wherein the mold includes cooling passages that are spaced apart from the cavity, wherein during the step of cooling the mixture a heat transfer fluid is circulated through the cooling passages to aid in the dissipation of heat from the mixture, and wherein the cooling passages have a number of compartmentalized sections and the method further comprises modulating the flow of the heat transfer fluid at differing rates through the different compartmentalized sections while the heat transfer fluid is circulated through the cooling passages to provide differing cooling rates to corresponding portions of the mixture near the compartmentalized sections to substantially uniformly dissipate heat from the mixture.

13. The method of claim 1 wherein the component includes a first surface and a second surface disposed opposite and substantially parallel to the first surface, wherein a cross sectional thickness between the first and second surfaces is at least 6 millimeters.

14. The method of claim 1 wherein the component is a vehicle rocker panel or a vehicle rear spoiler.

15. The method of claim 3 wherein the outer surface is opposite the inlet.

16. A method of molding comprising:
heating a mixture of polymer and blowing agent;
injecting fluid into a cavity of a mold; and
injecting the mixture into the cavity while the fluid displaces a portion of the cavity to produce a backpressure of fluid against the mixture, wherein the backpressure is in contact with a portion of the mixture not engaging a wall of the cavity from the time of injecting the mixture, through a reduction in the backpressure, and until the mixture is cooled to form a vehicle component.

17. The method of claim 16 further comprising reducing the backpressure in the cavity to a pressure above ambient to promote releasing and expanding of the blowing agent while cooling the mixture in the mold to form at least a portion of the component.

18. The method of claim 16 wherein the mixture is injected into the cavity through a first port in a first direction and the is fluid injected into the cavity through a second port in a second direction that opposes the first direction to exert the backpressure against the mixture.

19. The method of claim 16 wherein the mixture is injected into the cavity in a single shot.

* * * * *